(12) United States Patent
O'Leary et al.

(10) Patent No.: US 6,748,154 B2
(45) Date of Patent: Jun. 8, 2004

(54) OPTICAL MODULE ACCESS TRAY

(75) Inventors: Mitchell J. O'Leary, Ottawa (CA); Cindy Lee, Kanata (CA); Jon Bulman-Fleming, Ottawa (CA); Bhupendra Patel, Aylmer (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 10/108,789

(22) Filed: Mar. 28, 2002

(65) Prior Publication Data

US 2003/0185537 A1 Oct. 2, 2003

(51) Int. Cl.[7] .................................................. G02B 6/00
(52) U.S. Cl. ........................ 385/135; 439/131; 439/142
(58) Field of Search .......................... 385/135; 439/131, 439/142

(56) References Cited

U.S. PATENT DOCUMENTS

| | | | | |
|---|---|---|---|---|
| 4,712,157 A | * | 12/1987 | Simonson et al. | 361/643 |
| 4,800,588 A | * | 1/1989 | Poster, Jr. | 379/412 |
| 4,824,196 A | * | 4/1989 | Bylander | 385/134 |
| 5,112,119 A | * | 5/1992 | Cooke et al. | 312/283 |
| 5,337,400 A | * | 8/1994 | Morin et al. | 385/135 |
| 5,778,132 A | * | 7/1998 | Csipkes et al. | 385/135 |
| 6,301,424 B1 | * | 10/2001 | Hwang | 385/135 |
| 6,483,107 B1 | * | 11/2002 | Rabinovitz et al. | 250/239 |
| 6,556,763 B1 | * | 4/2003 | Puetz et al. | 385/135 |

* cited by examiner

Primary Examiner—Michael C. Zarroli
(74) Attorney, Agent, or Firm—Fish & Richardson P.C.

(57) ABSTRACT

An optical module includes an optical amplifier to amplify optical signals received over optical fiber and an access tray that slides into and out of the optical module. The access tray provides access to optical fiber connections to and from the optical amplifier. The access tray includes a housing that slides into and out of the optical module, a first connection to mate to the optical fiber coming from the amplifier, a second connection to mate to optical fiber going to the amplifier, and a door, attached to the housing, which restricts access to the first connector and the second connector when closed.

19 Claims, 6 Drawing Sheets

OPTICAL MODULE ACCESS TRAY

TECHNICAL FIELD

This application relates to an access tray for use with an optical module.

BACKGROUND

An optical amplifier site is placed roughly every one hundred kilometers (100 KM) along an optical transmission network. Each optical amplifier site may contain one or more optical modules to boost the signals being transmitted along the network.

In more detail, an "incoming" optical fiber is connected to the optical amplifier site, over which signals are transmitted from a previous node on the optical transmission network. The optical module amplifies the signals. An "outgoing" optical fiber is also connected to the optical amplifier site, over which the amplified signals are transmitted to a next node on the optical transmission network.

SUMMARY

In general, in one aspect, the invention is directed to an access tray for use with an optical module. The access tray includes a housing that slides into and out of the optical module, a first connection to mate to incoming optical fiber, a second connection to mate to outgoing optical fiber, and a door, attached to the housing, which restricts access to the first connector and the second connector when closed. This aspect may include one or more of the following:

The access tray may include a lock, which connects the housing to the optical module. In a locked position, the lock prevents the housing from sliding into and out of the optical module. The housing may also pivot relative to the optical module. Pivoting of the housing may occur after the housing slides a predetermined amount outside of the optical module. The access tray may include a second lock. In a locked position, the second lock prevents the housing from pivoting relative to the optical module.

The housing may be made of plastic. The access tray may include a metal enclosure, located inside the optical module. The housing may slide into and out of the metal enclosure. The first connection may be a first connector pair and the second connection may be a second connector pair. The first connection may be a first spliced connection and the second connection may be a second spliced connection. The access tray may include a storage area to store optical fiber slack.

In general, in another aspect, the invention is directed to an optical module, which includes an optical amplifier to amplify optical signals received over optical fiber, and an access tray, which slides into and out of the optical module. The access tray provides access to optical fiber connections to and from the optical amplifier. This aspect of the invention may include one or more of the following.

The access tray may include a housing that slides into and out of the optical module, a first connection to mate to optical fiber coming from the amplifier, a second connection to mate to optical fiber going to the amplifier, and a door, attached to the housing, which restricts access to the first connector and the second connector when closed. The module may include a lock, which connects the housing to the optical module. In a locked position, the lock may prevent the housing from sliding into and out of the optical module.

The housing may also pivot relative to the optical module. Pivoting of the housing may occur after the housing slides a predetermined amount outside of the optical module. The module may include a second lock, which connects the housing to the optical module. In a locked position, the lock may prevent the housing from pivoting relative to the optical module. The housing may be made of plastic. The module may include a metal enclosure located inside the optical module. The housing may slide into and out of the metal enclosure.

The first connection may include a first connector pair and the second connection may include a second connector pair. The first connection may be a first spliced connection and the second connection may be a second spliced connection. The access tray may also include a storage area for storing optical fiber slack.

DESCRIPTION OF THE DRAWINGS

Like reference numerals in different figures indicate like elements.

DESCRIPTION

Figure 1:
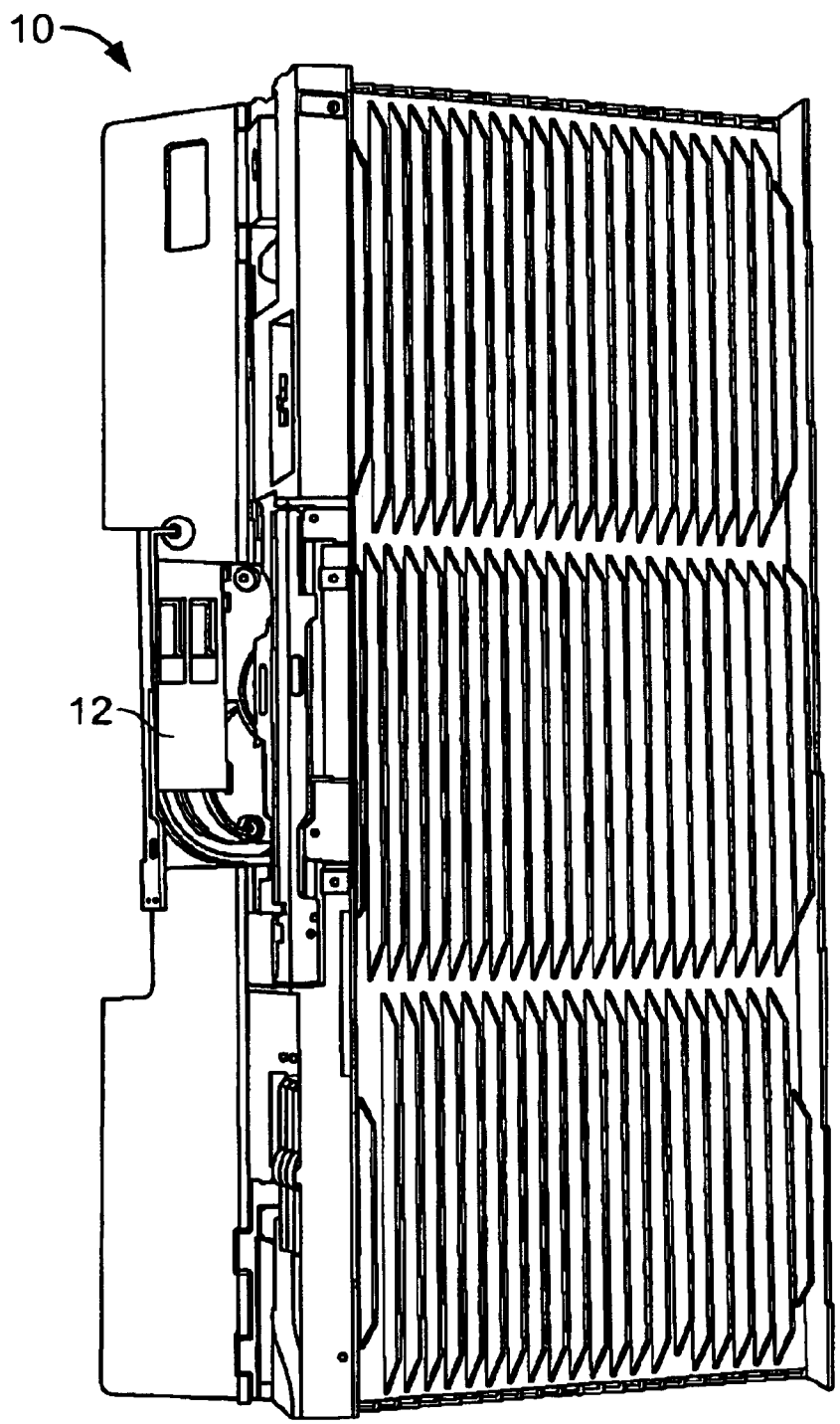
FIG. 1 is diagram of an optical module.

Referring to FIG. 1, an optical module 10 is shown. Optical module 10 includes an access tray 12 and one or more optical amplifiers (not shown) within its enclosure. An incoming optical fiber from an optical network is connected to optical module 10 via access tray 12. Signals from that fiber are routed to the optical amplifier(s), where they are amplified for transmission over a next span of the optical network. The signals are transmitted over an outgoing optical fiber, connected via access tray 12, to the next span.

Figure 2:
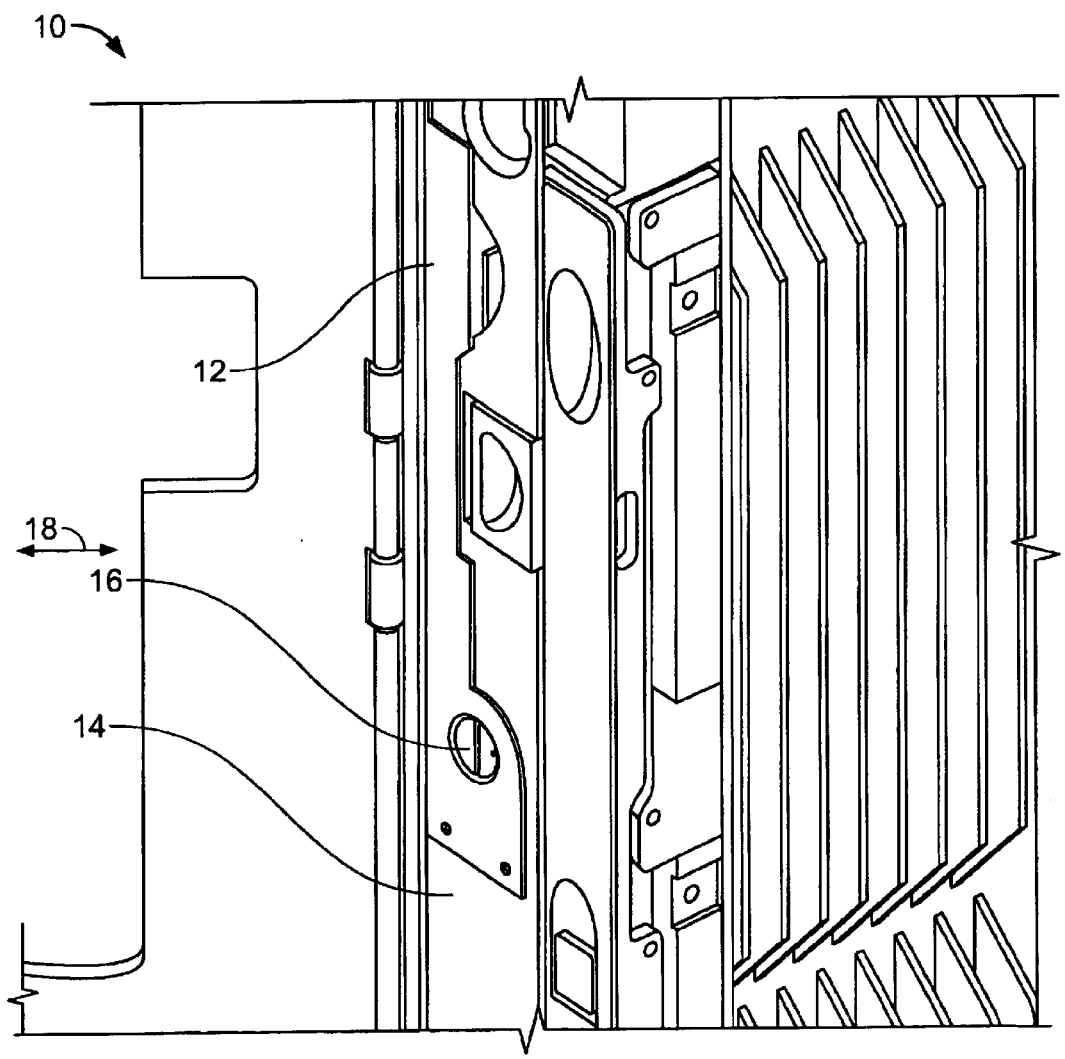
FIG. 2 is a close-up view of an access tray for the optical module in a closed position.

Referring to FIG. 2, a close-up view is shown of the area of optical module 10 containing access tray 12. In its closed position (shown), access tray 12 is substantially flush with the side surface 14 of optical module 10. A dime lock 16 connects the housing of access tray 12 to optical module 10. When dime lock 16 is locked (shown), it prevents access tray 12 from sliding into and out of optical module 10. When dime lock 16 is unlocked, access tray 12 may slide into and out of optical module 10 in the directions of arrow 18 (i.e., perpendicular to the side surface 14 of optical module 10). The amount of sliding is limited, as described below.

Figure 3:
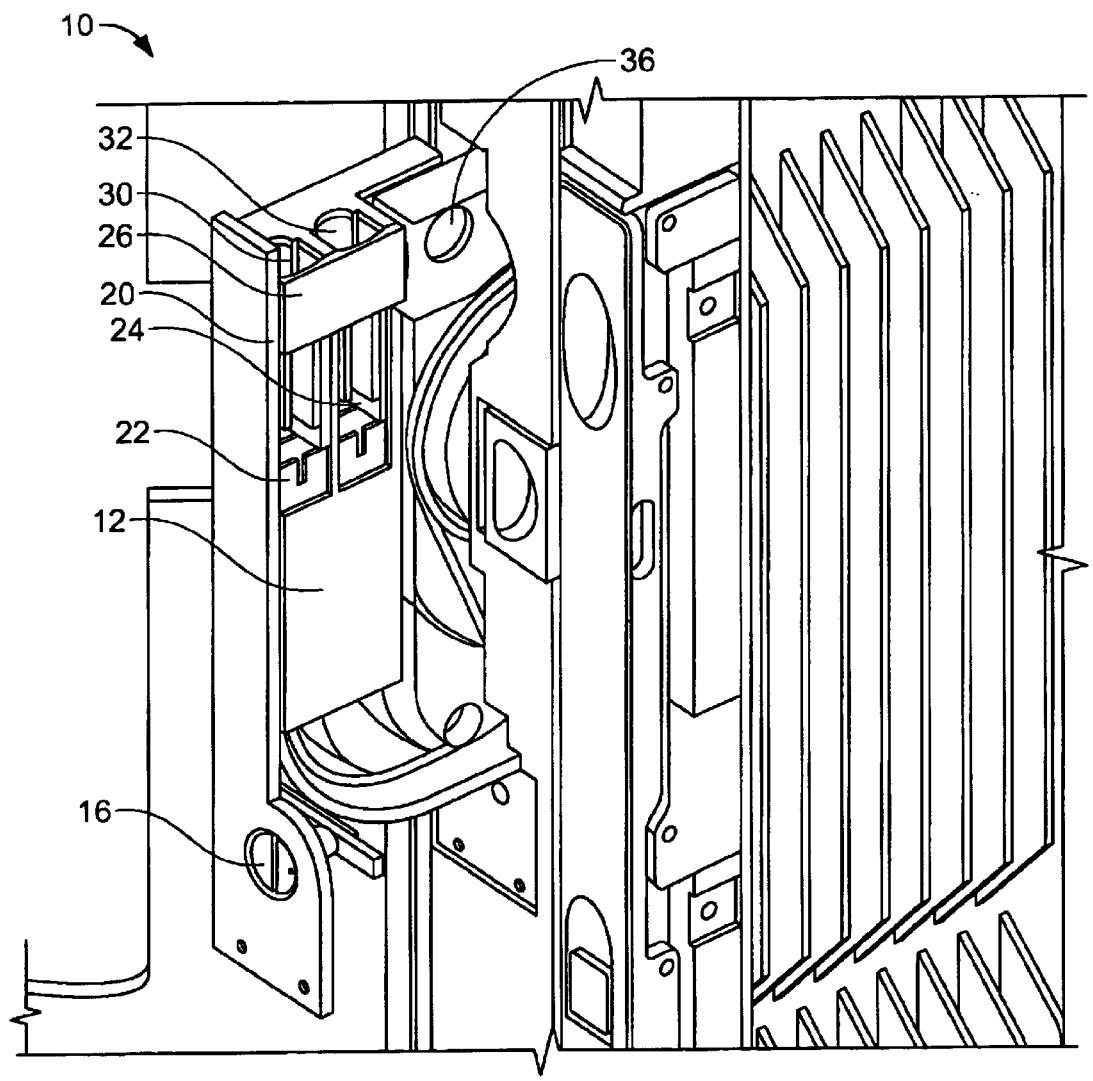
FIG. 3 is a close-up view of the access tray for the optical module in an open position.

FIG. 3 shows access tray 12 slid out of optical module 10. As shown, access tray 12 includes a housing 20, optical fiber connections 22 and 24, door 26, and another dime lock 36. Also included within access tray 12, but not shown in FIG. 2, are a metal enclosure located within optical module 10 and a storage area for storing optical fiber slack.

In this embodiment, housing 20 is made of plastic or some other polymer, although other types of materials may be used. Housing 20 fits slidably within the metal enclosure (see FIG. 6) located in optical module 10. Door 26 connects to housing 20. In the closed position shown in FIG. 3, the door restricts access to the optical connections 22 and 24. The holes 30 and 32 in the door allow the customer to disconnect the in and out fibers but prevent access to the optical connector mated pairs until they are disconnected. At this time the customer can open the door and gain access to both adapters and the other pair of system connectors.

The connections 22 and 24 may be optical connector adapters, which mate to corresponding optical connectors on incoming and outgoing optical fiber (i.e., the connections may be optical connector pairs). Optical connectors are generally used for low-power optical connections. Alternatively, connections 22 and 24 may be spliced connections, which are more often used for high-power optical connections.

Figure 4:
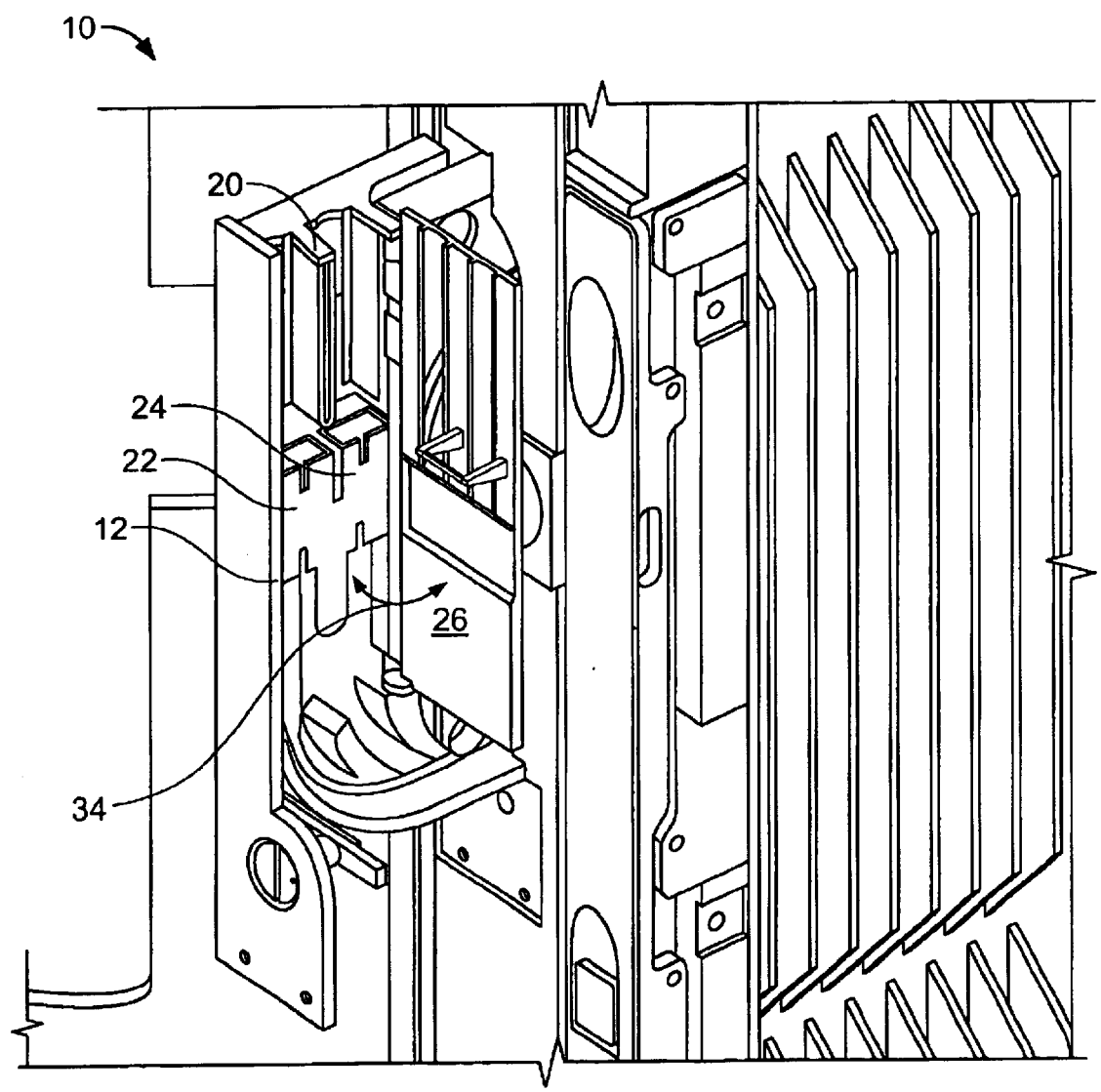
FIG. 4 is a close-up view of the access tray for the optical module with the access tray door open.

FIG. 4 shows access tray 12 in the same position as in FIG. 3, but with door 26 open. Door 26 opens and closes in the direction of arrow 34. Opening door 26 exposes connections 22 and 24 (which, in FIG. 4, are optical connectors), allowing a user to connect incoming and outgoing optical fiber to optical module 10. A delay feature prevents a user from breaking an optical connection for a period of time (e.g., one second) until the optical signals can be discontinued in the optical fiber. The delay feature can be an electronic control in the connections, which triggers power-down of the signals when disconnection is attempted.

Figure 5:
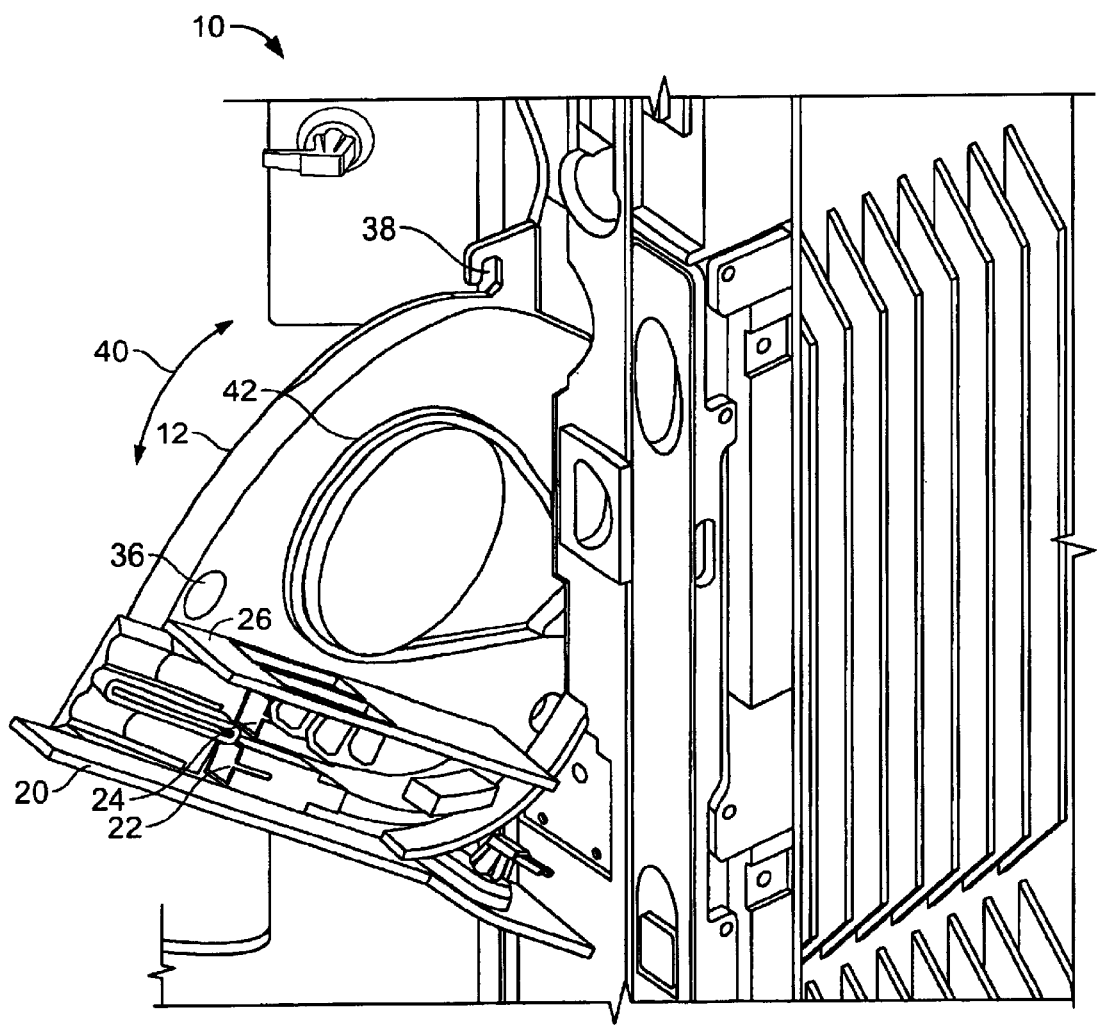
FIG. 5 is a close-up view of the access tray pivoted relative to the optical module.

Access tray 12 also includes an area for storing optical fiber slack from the incoming (or outgoing) connection. This is shown in FIG. 5. FIG. 5 shows access tray 12 pivoted relative to optical module 10. In this regard, access tray 12 includes a dime lock 36, which mates to corresponding hook portion 38. When this dime lock is in an unlocked position (disengaged), and access tray 12 is pulled-out a predetermined distance relative to optical module 10, access tray 12 can pivot in the directions of arrow 40 relative to optical module 10. This pivoting provides the user with access to the storage area 42 which stores optical fiber slack. It also provides easier access to the connections 22 and 24.

Figure 6:
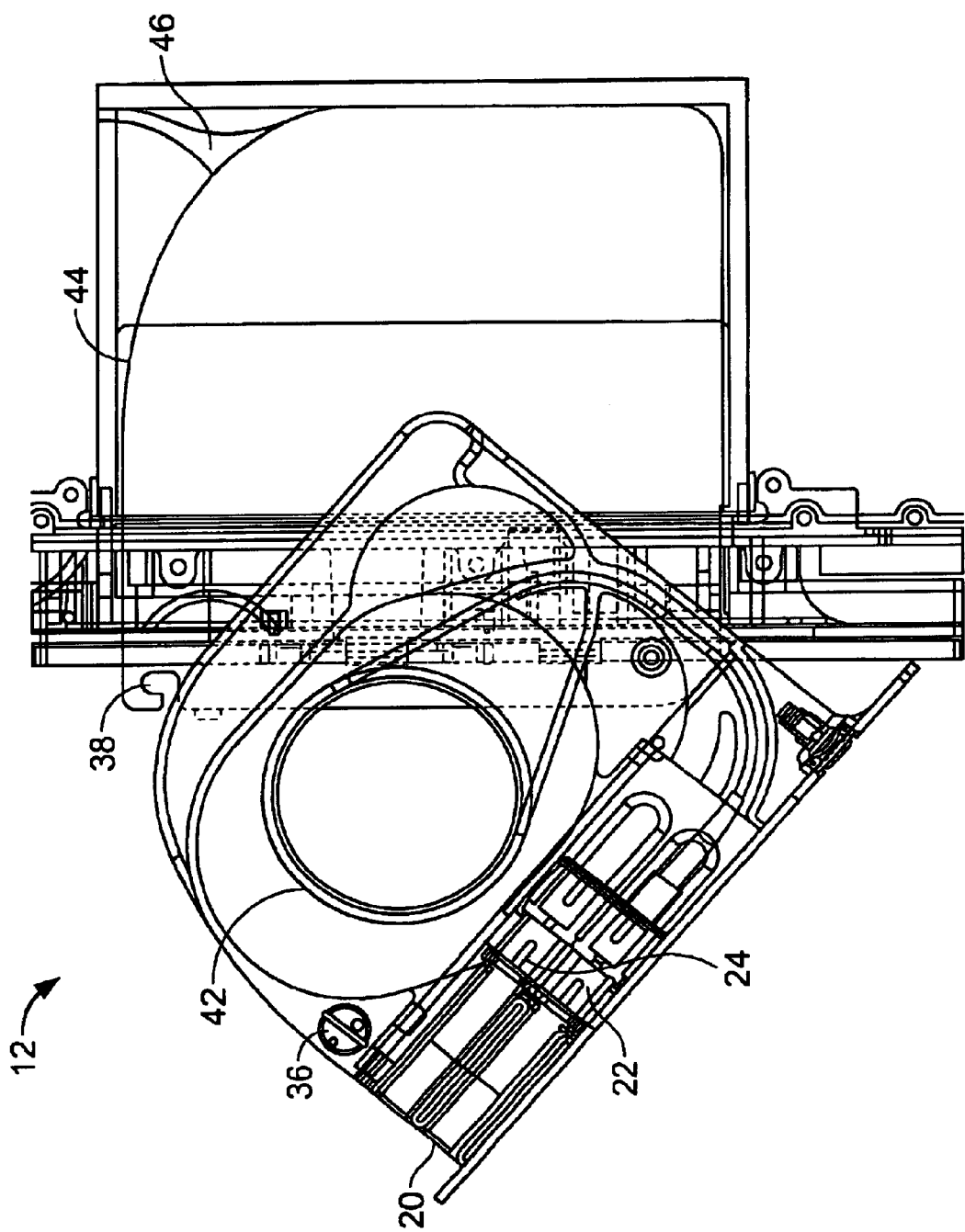
FIG. 6 is a computer-generated schematic of the access tray shown in FIGS. 1 to 5.

As noted above, the housing of tray 12 slides into a metal enclosure within optical module 10. FIG. 6 is a CAD (computer-aided design) drawing of access tray 12 in a pivoted position, which shows this metal enclosure 44. The tray position of FIG. 6 corresponds to the tray position of FIG. 5. The enclosure 44 acts as a Faraday cage, reducing the amount of electromagnetic interference (EMI) imparted onto the optical fiber. Metal enclosure 44 may be made from any type of electrically-conductive metal; however, aluminum is used in this embodiment. Other types of EMI-shielding materials may be used instead of, or in addition to, the metal that makes up the enclosure.

Also shown in FIG. 6 are dime lock 36, connections 22 and 24, and optical fiber storage area 42. A passageway 46, which also may be EMI-shielded, guides the optical fiber into access tray 12.

Other embodiments not described herein are also within the scope of the following claims. For example, the access tray is not limited to using optical connectors or spliced connections. Any type of optical connection may be used. The access tray may be made from materials other than those specified herein. The access tray may be incorporated into devices other than the optical modules described above.

What is claimed is:

1. An access tray for use with an optical module, the access tray comprising:
   a housing that slides into and out of the optical module;
   a first connection to mate to incoming optical fiber;
   a second connection to mate to outgoing optical fiber; and
   a door, attached to the housing, which restricts access to the first connection and the second connection when closed, the door having at least one aperture which allows access to the incoming optical fiber and the outgoing optical fiber;
   wherein the housing also pivots relative to the optical module.

2. The access tray of claim 1, further comprising:
   a lock which connects the housing to the optical module;
   wherein, in a locked position, the lock prevents the housing from sliding into and out of the optical module.

3. The access tray of claim 1, wherein pivoting of the housing occurs after the housing slides a predetermined amount outside of the optical module.

4. The access tray of claim 3, further comprising:
   a lock which connects the housing to the optical module;
   wherein, in a locked position, the lock prevents the housing from pivoting relative to the optical module.

5. The access tray of claim 1, wherein the housing is made of plastic.

6. The access tray of claim 1, further comprising:
   a metal enclosure, located inside the optical module, the housing sliding into and out of the metal enclosure.

7. A The access tray of claim 1, wherein the first connection comprises a first connector pair and the second connection comprises a second connector pair.

8. The access tray of claim 1, wherein the first connection comprises a first spliced connection and the second connection comprises a second spliced connection.

9. The access tray of claim 1, further comprising:
   a storage area for storing optical fiber slack.

10. An optical module, comprising:
    an optical amplifier to amplify optical signals received over optical fiber; and
    an access tray which slides into and out of the optical module, the access tray providing access to optical fiber connections to and from the optical amplifier, the access tray comprises:
    a housing that slides into and out of the optical module;
    a first connection to mate to optical fiber coming from the amplifier;
    a second connection to mate to optical fiber going to the amplifier; and
    a door, attached to the housing, which restricts access to the first connector and the second connector when closed, the door having at least one aperture which allows access to the incoming optical fiber and the outgoing optical fiber.

11. The optical module of claim 10, further comprising:
    a lock which connects the housing to the optical module;
    wherein, in a locked position, the lock prevents the housing from sliding into and out of the optical module.

12. The optical module of claim 10, wherein the housing also pivots relative to the optical module.

13. The optical module of claim 12, wherein pivoting of the housing occurs after the housing slides a predetermined amount outside of the optical module.

14. The optical module of claim 13, further comprising:
    a lock which connects the housing to the optical module;
    wherein, in a locked position, the lock prevents the housing from pivoting relative to the optical module.

15. The optical module of claim 10, wherein the housing is made of plastic.

16. The optical module of claim 10, further comprising:
    a metal enclosure, located inside the optical module, the housing sliding into and out of the metal enclosure.

17. The optical module of claim 10, wherein the first connection comprises a first connector pair and the second connection comprises a second connector pair.

18. The optical module of claim 10, wherein the first connection comprises a first spliced connection and the second connection comprises a second spliced connection.

19. The optical module of claim 10, wherein the access tray further comprises:
    a storage area for storing optical fiber slack.

* * * * *